(12) United States Patent
Aketa et al.

(10) Patent No.: US 11,985,452 B2
(45) Date of Patent: May 14, 2024

(54) COLOR CONVERSION ELEMENT

(71) Applicant: Panasonic Intellectual Property Management Co., Ltd., Osaka (JP)

(72) Inventors: Takanori Aketa, Osaka (JP); Yosuke Honda, Nara (JP); Takashi Kishida, Osaka (JP); Toru Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 643 days.

(21) Appl. No.: 17/270,622

(22) PCT Filed: Jul. 23, 2019

(86) PCT No.: PCT/JP2019/028759
§ 371 (c)(1),
(2) Date: Feb. 23, 2021

(87) PCT Pub. No.: WO2020/044870
PCT Pub. Date: Mar. 5, 2020

(65) Prior Publication Data
US 2021/0344883 A1 Nov. 4, 2021

(30) Foreign Application Priority Data
Aug. 28, 2018 (JP) ................. 2018-159638

(51) Int. Cl.
*G02B 5/20* (2006.01)
*G02B 5/28* (2006.01)
*H04N 9/31* (2006.01)

(52) U.S. Cl.
CPC ........... *H04N 9/3158* (2013.01); *G02B 5/206* (2013.01); *G02B 5/285* (2013.01); *H04N 9/3152* (2013.01); *H04N 9/3161* (2013.01)

(58) Field of Classification Search
CPC ...... G02B 5/206; G02B 5/285; G02B 26/008; G03B 21/204; G03B 21/2066; H04N 9/3158; H04N 9/3161
See application file for complete search history.

(56) References Cited

U.S. PATENT DOCUMENTS

2005/0026530 A1* 2/2005 Toguchi ............... H10K 50/854
313/506
2005/0270775 A1 12/2005 Harbers et al.
(Continued)

FOREIGN PATENT DOCUMENTS

CN 103105659 5/2013
JP 2008-251685 10/2008
(Continued)

OTHER PUBLICATIONS

Office Action from Japan Patent Office (JPO) in Japanese Patent Application No. 2020-540150, dated Feb. 1, 2022.
(Continued)

*Primary Examiner* — Mustak Choudhury
(74) *Attorney, Agent, or Firm* — Greenblum & Bernstein, P.L.C.

(57) ABSTRACT

A color conversion element includes: a substrate; a phosphor portion that is disposed above the substrate, receives laser light transmitted from an outside, and emits light in a color different from a color of the laser light; a reflective layer that includes a dielectric multilayer film and is disposed on a principal surface of the phosphor portion facing the substrate; and a joining portion interposed between the reflective layer and the substrate to join the reflective layer and the substrate. The joining portion includes an air layer that exposes the reflective layer in a position where the air layer at least partially overlaps an irradiation region in a plan
(Continued)

view, the irradiation region being a region irradiated with the laser light on the phosphor portion.

8 Claims, 9 Drawing Sheets

(56) References Cited

U.S. PATENT DOCUMENTS

| | | | |
|---|---|---|---|
| 2010/0176410 | A1 | 7/2010 | Furuyama |
| 2014/0043829 | A1 | 2/2014 | Wu et al. |
| 2015/0316233 | A1* | 11/2015 | Kawamata ............... F21V 13/08 29/428 |
| 2019/0120442 | A1 | 4/2019 | Okada et al. |
| 2019/0302587 | A1* | 10/2019 | Shimizu ............... G03B 21/006 |
| 2019/0302591 | A1* | 10/2019 | Nojima ............... G03B 21/204 |
| 2021/0286165 | A1 | 9/2021 | Asano |

FOREIGN PATENT DOCUMENTS

| | | |
|---|---|---|
| JP | 2009-105379 | 5/2009 |
| JP | 2010-165754 | 7/2010 |
| JP | 2011-009305 | 1/2011 |
| JP | 2012-129135 | 7/2012 |
| JP | 2015-103539 | 6/2015 |
| JP | 2016-099566 | 5/2016 |
| JP | 6179516 | 8/2017 |
| JP | 2019-174528 | 10/2019 |
| JP | 2019-175570 | 10/2019 |
| JP | 2020-118946 | 8/2020 |
| WO | 2017/217486 | 12/2017 |
| WO | 2018/074125 | 4/2018 |
| WO | 2020/153144 | 7/2020 |

OTHER PUBLICATIONS

Office Action from Japan Patent Office (JPO) in Japanese Patent Appl. No. 2020-540150, dated Jul. 12, 2022.

International Search Report (ISR) from International Searching Authority (Japan Patent Office) in International Pat. Appl. No. PCT/JP2019/028759, dated Oct. 8, 2019, along with an English language translation thereof.

Extended European Search Report (EESR) from European Patent Office (EPO) in European Patent Application No. 19853916.5, dated Sep. 14, 2021.

Office Action from China National Intellectual Property Administration (CNIPA) in Chinese Patent Application No. 201980052034.6, dated Apr. 26, 2022, together with an English language translation of the Search Report.

Extended European Search Report (EESR) from European Patent Office (EPO) in European Patent Appl. No. 19853916.5, dated Oct. 19, 2023.

* cited by examiner

COLOR CONVERSION ELEMENT

TECHNICAL FIELD

The present invention relates to a color conversion element in which a phosphor portion is disposed above a substrate.

BACKGROUND ART

For example, a technique for joining a phosphor portion and a substrate with a heat conductive adhesive to improve heat dissipation of a phosphor wheel (color conversion element) used for a projection device, such as a projector, has been disclosed (for example, see Patent Literature (PTL) 1). In addition, a reflective layer is disposed above the principal surface of the substrate, the principal surface facing the phosphor portion. Therefore, light from the phosphor portion is reflected off the reflective layer and this enhances conversion efficiency.

CITATION LIST

Patent Literature

PTL 1: Japanese Unexamined Patent Application Publication No. 2016-99566

SUMMARY OF THE INVENTION

Technical Problem

In recent years, further improvement has been desired in the color conversion efficiency of the color conversion element.

Therefore, the present invention aims to provide a color conversion element that is capable of improving the conversion efficiency.

Solution to Problem

A color conversion element according to one aspect of the present invention includes: a substrate; a phosphor portion that is disposed above the substrate, receives laser light transmitted from an outside, and emits light in a color different from a color of the laser light; a reflective layer that includes a dielectric multilayer film and is disposed on a principal surface of the phosphor portion, the principal surface of the phosphor portion being a surface facing the substrate; and a joining portion that is interposed between the reflective layer and the substrate to join the reflective layer and the substrate. The joining portion includes an air layer that exposes the reflective layer in a position where the air layer at least partially overlaps an irradiation region in a plan view, the irradiation region being a region irradiated with the laser light on the phosphor portion.

Advantageous Effect of Invention

The color conversion element according to the present invention improves the conversion efficiency.

DESCRIPTION OF EXEMPLARY EMBODIMENT

The following describes a color conversion element according to an embodiment of the present invention with reference to the accompanying drawings. Note that the embodiment described below shows specific preferable examples according to the present invention. Therefore, the numerical values, shapes, materials, structural elements, the arrangement and connection of the structural elements, etc. shown in the following embodiment are mere examples, and do not limit the scope of the present invention. Of the structural elements in the following embodiment, structural elements not recited in any one of the independent claims representing broadest concepts of the present invention are described as optional structural elements.

In addition, each diagram is a schematic diagram and is not necessarily a precise illustration. In each figure, structural elements that are essentially the same share like reference signs.

Hereinafter, an embodiment will be described.

Figure 1:
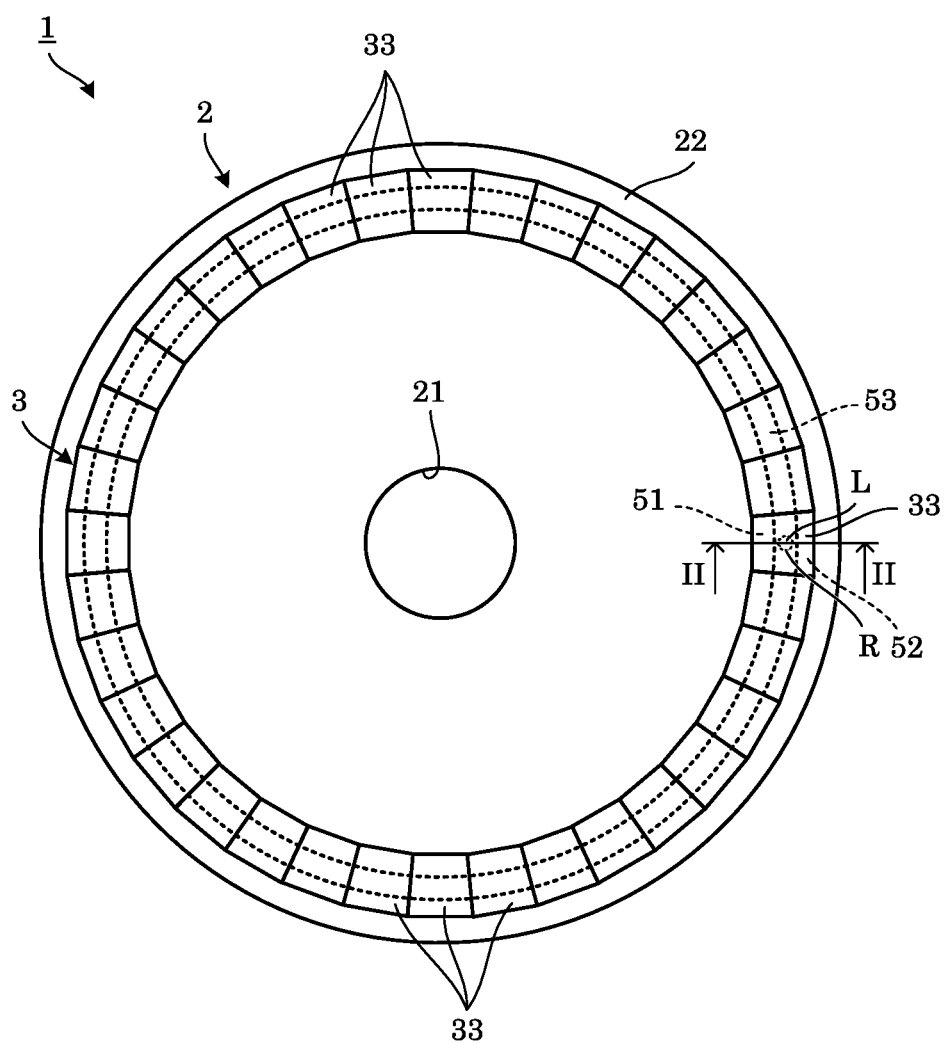
FIG. 1 is a schematic diagram of the configuration of a color conversion element according to an embodiment.
Figure 2:
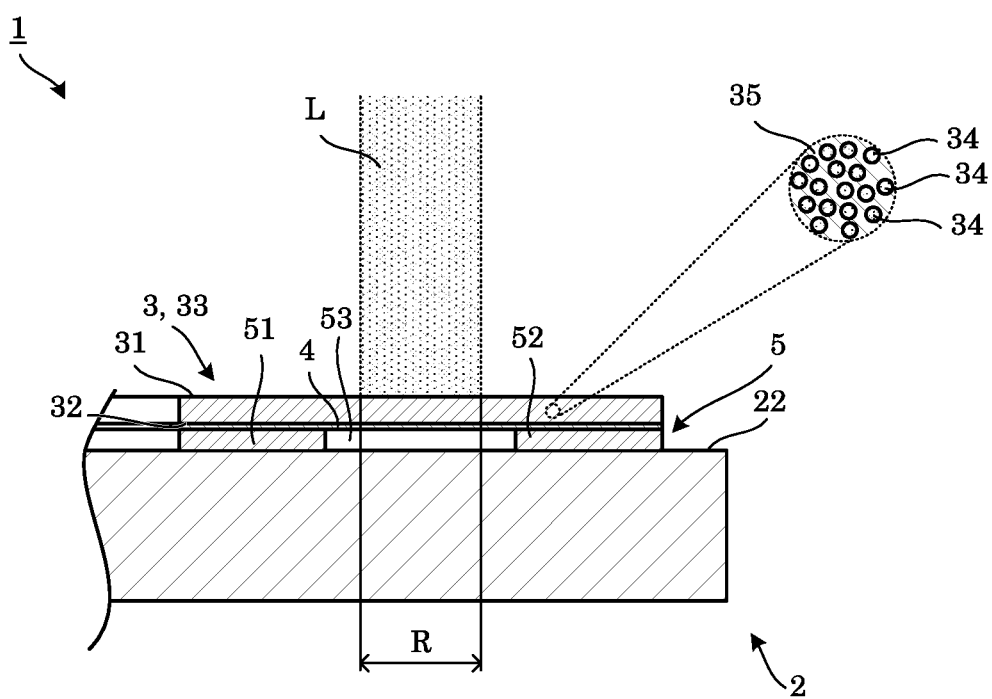
FIG. 2 is a cross-sectional view taken along the line II-II in FIG. 1.

FIG. 1 is a schematic diagram of the configuration of a color conversion element according to the embodiment. FIG. 2 is a cross-sectional view taken along the line II-II in FIG. 1.

Color conversion element 1 is a phosphor wheel to be used in a projection device, such as a projector. The projection device includes a semiconductor laser element as a light source unit. The semiconductor laser element emits laser light L having a wavelength in a range of from violet to blue (430 nm to 490 nm) to color conversion element 1. Color conversion element 1 uses, as excitation light, laser light L emitted from the light source unit to emit white light. Hereinafter, color conversion element 1 will be described in detail.

As illustrated in FIGS. 1 and 2, color conversion element 1 includes substrate 2, phosphor portion 3, reflective layer 4, and joining portion 5. Note that in FIGS. 1 and 2, laser light L is illustrated by dot hatching. The region irradiated with laser light L in color conversion element 1 is called irradiation region R. Irradiation region R is fixed, but seems as if irradiation region R moves circumferentially with respect to color conversion element 1 because color conversion element 1 rotates.

Substrate 2 has, for example, a circular shape in a plan view, and through hole 21 is formed in a center portion of substrate 2. A rotation shaft in the projection device which is inserted into through hole 21 allows substrate 2 to rotate.

Substrate 2 has a thermal conductivity higher than the thermal conductivity of phosphor portion 3. This allows the heat transferred from phosphor portion 3 to be dissipated efficiently from substrate 2. More specifically, substrate 2 is formed using a metallic material, such as Al, $Al_2O_3$, MN, Fe and Ti. Note that substrate 2 may be formed using a material other than the metallic materials as long as the material has a thermal conductivity higher than the thermal conductivity of phosphor portion 3. Examples of materials other than the metallic materials include Si, ceramic, sapphire, and graphite.

Principal surface 22, which is one of the principal surfaces of substrate 2 is flat, and phosphor portion 3 is disposed above principal surface 22.

Phosphor portion 3 has a uniform thickness as a whole. Phosphor portion 3, for example, contains, in a dispersed state, phosphor particles (phosphor particles 34) that emit fluorescence when excited by laser light L. Phosphor particles 34 emit fluorescence when irradiated with laser light L. Therefore, first principal surface 31 of phosphor portion 3 on the side opposite to substrate 2 is the surface through which the fluorescence is emitted. In the present embodiment, the normal direction of second principal surface 32 of phosphor portion 3 is substantially the same as the direction of laser light L (incident direction) incident on phosphor portion 3. Second principal surface 32 is the surface facing substrate 2. The term "substantially the same" is not only means exactly the same, but also allows an acceptable error of several percent. In addition, first principal surface 31 of phosphor portion 3 may have minute projections and recesses throughout phosphor portion 3. More specifically, the surface roughness of first principal surface 31 may be greater than a predetermined value. As a result, first principal surface 31 of phosphor portion 3 has a low reflectance, which can improve efficiencies of extraction and reception of light.

Phosphor portion 3 has an annular shape in the plan view as a whole. Phosphor portion 3 is formed by annularly arranging individual pieces 33 having a sheet shape. Individual pieces 33 have a uniform thickness. Individual pieces 33 are identical in shape and of the same type. More specifically, each of individual pieces 33 has a trapezoidal shape in the plan view. Note that individual pieces 33 may be in any shape as long as individual pieces are sheet-shaped. Examples of other shapes in the plan view of individual pieces 33 include a quadrilateral shape, a triangular shape, and other polygonal shapes, for instance.

The adjacent sides of individual pieces 33 adjacent to each other are substantially coincide with each other. Individual pieces 33 include at least one type of phosphor particles 34. In the present embodiment, individual pieces 33 emit white light and includes three types of phosphor particles 34 in a proper ratio: a red phosphor, a yellow phosphor, and a green phosphor. When irradiated with laser light L, the red phosphor emits red light, the yellow phosphor emits yellow light, and the green phosphor emits green light.

While the types and characteristics of phosphor particles 34 are not particularly limited, phosphor particles having a high thermal resistance is desirable because laser light L used as the excitation light has relatively high output. In addition, while the types of base material 35 that holds phosphor particles 34 in a dispersed state are not particularly limited, base material 35 is desirable to have a high light transmittance for the wavelength of the excitation light and the wavelength of the light emitted from phosphor particles 34. More specifically, for example, the material of base material 35 may be glass or ceramic. Note that phosphor portion 3 may be a polycrystalline or monocrystalline substance including one type of phosphor.

In addition, reflective layer 4 that reflects laser light L and light emitted from phosphor particles 34 is disposed on the entire back surface (the principal surface facing joining portion 5) of each individual piece 33. Reflective layer 4 has a uniform thickness.

Reflective layer 4 is disposed on the back surface of each individual piece 33, as previously described. In other words, reflective layer 4 is disposed on the principal surface of phosphor portion 3 that faces substrate 2 (second principal surface 32). Reflective layer 4 has entirely a uniform thickness. Reflective layer 4 is a dielectric multilayer layer film. The dielectric multilayer film is a multilayer stack including alternating layers of a transparent dielectric material having a high refractive index (n=2.0 to 3.0) and layers of a transparent dielectric material having a low refractive index (n=1.0 to 1.9). The dielectric multilayer film can achieve desired reflectance properties by adjusting the refractive index of the materials and the thickness of the dielectric multilayer film. More specifically, the refractive index of the materials and the thickness of the dielectric multilayer layer film are adjusted so that the dielectric multilayer layer film, which forms reflective layer 4, has a high reflectance for laser light L and light emitted from phosphor particles 34. Reflective layer 4 is disposed on the back surface of each individual piece 33, for example, by sputtering or deposition.

Joining portion 5 is interposed between reflective layer 4 and substrate 2 to join reflective layer 4 and substrate 2. More specifically, joining portion 5 is formed using a resin-based adhesive such as a silicon resin, for example. Joining portion 5 is applied to principal surface 22 of substrate 2, and then reflective layer 4 on each individual piece 33 is attached to joining portion 5. In this manner, individual pieces 33 constitute phosphor portion 3 having an annular shape in the plan view above substrate 2. In this state, reflective layer 4 on individual pieces 33 is also formed into an annular shape in the plan view in accordance with the shape of phosphor portion 3.

Joining portion 5 includes first joining portion 51 and second joining portion 52. First joining portion 51 and second joining portion 52 have a uniform thickness. First joining portion 51 and second joining portion 52 each have a concentric annular shape and are spaced apart by a predetermined distance in the radial direction. First joining portion 51 has a smaller diameter than second joining portion 52. First joining portion 51 is located in a more inward position than second joining portion 52. First joining portion 51 joins substrate 2 and an inner peripheral portion of reflective layer 4. The inner peripheral portion of reflective layer 4 is located in a more inward position than irradiation region R.

On the other hand, second joining portion 52 has a larger diameter than first joining portion 51 and is located in a more outward position than first joining portion 51. Second joining portion 52 joins second substrate 2 and an outer peripheral portion of reflective layer 4. The outer peripheral portion of reflective layer 4 is located in a more outward position than irradiation region R.

Air layer 53 is formed between first joining portion 51 and second joining portion 52. Air layer 53 has an annular shape concentric with first joining portion 51 and second joining portion 52. The centers of first joining portion 51, second joining portion 52, and air layer 53 are the rotation center of color conversion element 1. Air layer 53 is sealed by first joining portion 51 and second joining portion 52, because first joining portion 51 and second joining portion 52 are each a continuous, integrated component along the peripheral direction.

Air layer 53 exposes reflective layer 4 and substrate 2. In other words, reflective layer 4 and substrate 2 are in contact with air by air layer 53.

Air layer 53 is located in a position where air layer 53 at least partially overlaps irradiation region R in the plan view. In the present embodiment, air layer 53 is formed in a position and in a size that includes irradiation region R entirely in the plan view. As described above, air layer 53 has an annular shape about the rotation center of color conversion element 1. Therefore, when color conversion element 1 rotates, air layer 53 always overlaps irradiation region R in the plan view.

[Operations of Projection Device]

The following describes the operations of the projection device.

When laser light L is emitted from the light source of the projection device, color conversion element 1 receives laser light L at phosphor portion 3 while color conversion element 1 is rotating. A portion of laser light L directly incidents on phosphor particles 34 in phosphor portion 3. In addition, another portion of laser light L that does not directly incident on phosphor particles 34 is reflected off reflective layer 4 and incidents on phosphor particles 34. Phosphor particles 34 convert laser light L that has reached phosphor particles 34 into white light and emit the white light. A portion of the white light emitted from phosphor particles 34 is directly emitted from phosphor portion 3 to the outside. Another portion of the light emitted from phosphor particles 34 is also emitted from phosphor portion 3 to the outside by being reflected off reflective layer 4.

Here, there is a small amount of light that passes through reflective layer 4, which includes a dielectric multilayer film. To prevent this, air layer 53 is provided in joining portion 5. In detail, in irradiation region R, as described above, air layer 53 is located directly below reflective layer 4. In this case, critical angle θc is expressed by Snell's law by the following expression (1):

$$\theta c = \arcsin(n2/n1) \quad (1)$$

Here, when refractive index n1 of phosphor portion 3 from which light enters is 1.8, and refractive index n2 of air layer 53 to which the light transmits is 1.0, critical angle θc is 33.8 degrees. Note that the thicknesses of the adhesive layer joining portion 5 and reflective layer 4 are very thin compared with the thickness of phosphor portion 3 or the thickness of air layer 53, and has an insignificant effect on critical angle θc. Therefore, such thickness is ignored in the calculation of critical angle θc.

On the other hand, when there is no air layer 53 in joining portion 5 is assumed. In other words, in irradiation region R, joining portion 5 is located directly below reflective layer 4 and reflective layer 4 is not exposed. In this case, if refractive index n1 of phosphor portion 3 from which light enters is 1.8, and refractive index n2 of joining portion 5 to which the light transmits is 1.4 (the refractive index when joining portion 5 is a silicon resin), critical angle θc is 51.1 degrees.

Thus, critical angle θc can be reduced in the present embodiment compared with when air layer 53 is not provided in joining portion 5. In other words, it is possible to increase the range (90 degrees-θc) of the incident angle of the total internal reflection. As described above, not only laser light L directly enters reflective layer 4, but also white light emitted by each phosphor particle 34 enters reflective layer 4. Although the incident angle of the white light with respect to reflective layer 4 is varied, more white light can be totally, internally reflected if the range of the incident angle of total internal reflection is increased. Therefore, the reflectance of reflective layer 4, which is a dielectric multilayer film, can be increased.

[Effects, etc.]

As described above, color conversion element 1 according to the present embodiment includes: substrate 2; phosphor portion 3 that is disposed above substrate 2, receives laser light L transmitted from an outside, and emits light in a color different from a color of laser light L; reflective layer 4 that includes a dielectric multilayer film and is disposed on a principal surface of phosphor portion 3, the principal surface of phosphor portion 3 being a surface facing substrate 2; and joining portion 5 that is interposed between reflective layer 4 and substrate 2 to join reflective layer 4 and substrate 2. Joining portion 5 includes air layer 53 that exposes reflective layer 4 in a position where air layer 4 at least partially overlaps irradiation region R in a plan view, irradiation region R being a region irradiated with laser light L on phosphor portion 3.

With this, since air layer 53 at least partially overlaps irradiation region R in the plan view, it is possible to increase the range (90 degrees-θc) of the incident angle of total internal reflection compared with when air layer 53 is not provided. Therefore, the reflectance of reflective layer 4, which is a dielectric multilayer layer film, can be increased, and conversion efficiency can also be increased.

In particular, in the present embodiment, air layer 53 is formed in a position and a size that includes irradiation region R entirely in the plan view. Therefore, the reflectance can be increased for the entire irradiation region R. In other words, conversion efficiency can be further increased.

Furthermore, phosphor portion 3 includes a plurality of individual pieces 33 having a sheet shape and being planarly arranged, the plurality of individual pieces including at least one type of phosphor (phosphor particles 34).

With this, since phosphor portion 3 is formed by planarly arranging a plurality of individual pieces 33, the stress acting upon heating can be dispersed. This suppresses deformation of phosphor portion 3 that occurs when laser light L is received. Therefore, the positional relationship between phosphor portion 3 and air layer 53 can be stabilized, and stable reflectance properties can be maintained.

Here, when a phosphor portion that is entirely integrally formed is used and its shape is annular in the plan view, such an integrated phosphor portion is easily affected by the stress concentration and the above problem is likely to occur. However, as in the present embodiment, phosphor portion 3 formed by arranging individual pieces 33 in an annular shape can disperse stress, thus achieving a high stress relief effect.

Note that in the above embodiment, an example in which phosphor portion 3 includes individual pieces 33 is described. However, the phosphor portion may be integrally molded as a whole.

Variation 1

Figure 3:
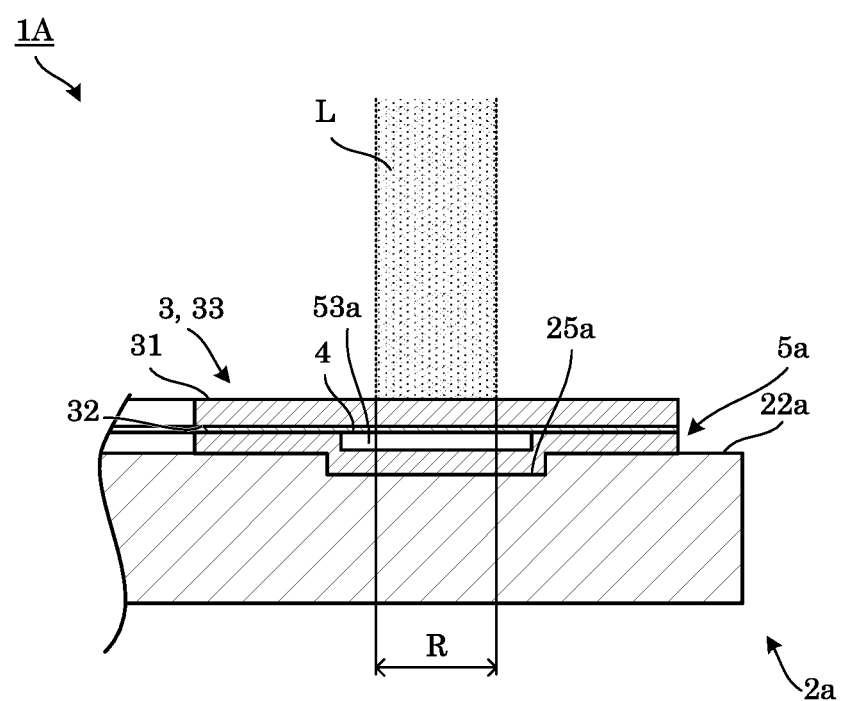
FIG. 3 is a cross-sectional view schematically illustrating the configuration of a color conversion element according to Variation 1.

Next, Variation 1 will be described. FIG. 3 is a cross-sectional view schematically illustrating the configuration of color conversion element 1A according to Variation 1, and more specifically, corresponds to FIG. 2. In the following description, the structural elements that are substantially the same as the structural elements of color conversion element 1 according to the embodiment share like reference signs. Detailed description of such structural elements will be omitted and only differences are described.

In the above embodiment, an example in which principal surface 22 of substrate 2 is flat has been described. Variation 1 describes an example in which recessed portion 25a is formed in principal surface 22a of substrate 2a.

More specifically, recessed portion 25a is provided in principal surface 22a of substrate 2a and located in a position where recessed portion 25a at least partially overlap irradiation region R in the plan view. In the present embodiment, recessed portion 25a is formed in a position and a size that include the entire irradiation region R in the plan view. Recessed portion 25a is formed in an annular shape about the rotation center of color conversion element 1 in the plan view. In other words, recessed portion 25a is an annular continuous groove in the plan view. Recessed portion 25a has a quadrilateral shape in a cross-sectional view. Air layer 53a is provided above recessed portion 25a. The cross section of recessed portion 25a may be in any shape.

Joining portion 5a partially flows into recessed portion 25a during manufacture. Such partial flow of joining portion 5a into recessed portion 25a ensures that air layer 53a is formed in a position where recessed portion 25a overlaps irradiation region R in the plan view. Note that while FIG. 3 illustrates a state where part of joining portion 5a is filled into the entire recessed portion 25a, joining portion 5a may be divided in recessed portion 25a. In any case, the presence of recessed portion 25a ensures the formation of air layer 53a, which exposes reflective layer 4.

Variation 2

Figure 4:
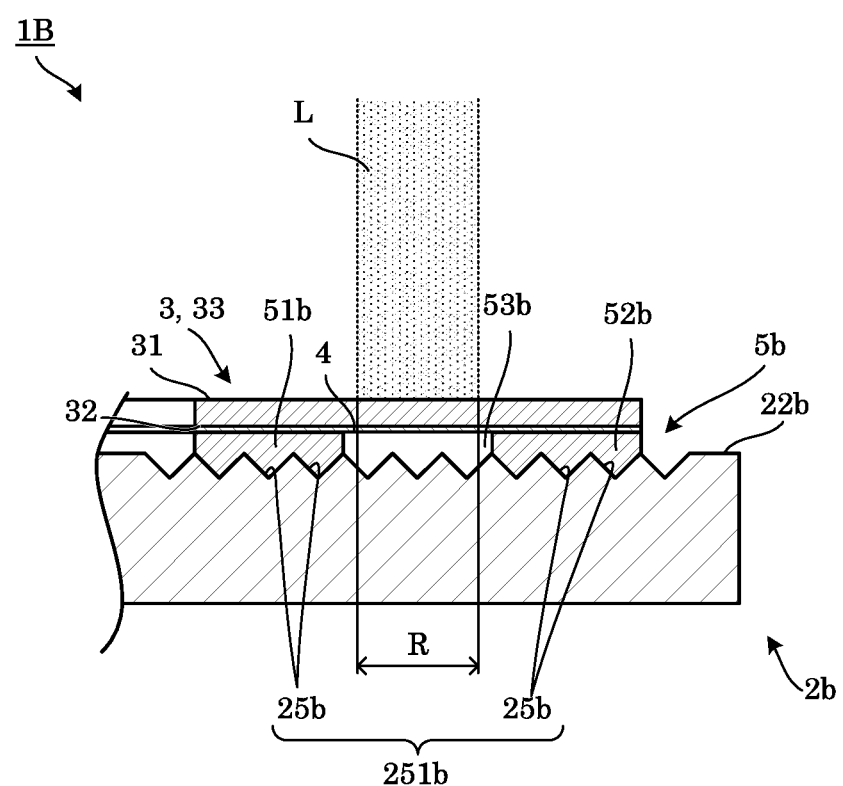
FIG. 4 is a cross-sectional view schematically illustrating the configuration of a color conversion element according to Variation 2.

Next, Variation 2 will be described. FIG. 4 is a cross-sectional view schematically illustrating the configuration of color conversion element 1B according to Variation 2, and more specifically, corresponds to FIG. 2. In the following description, the structural elements that are substantially the same as the structural elements of color conversion element 1 according to the embodiment share like reference signs. Detailed description of such structural elements will be omitted and only differences are described.

In the embodiment, an example in which principal surface 22 of substrate 2 is flat has been described. Variation 2 describes an example in which recessed portion group 251b including a plurality of recessed portions 25b is provided in principal surface 22b of substrate 2b.

More specifically, recessed portion group 251b is provided in principal surface 22b of substrate 2a and located in a position where recessed portion group 251b at least partially overlaps irradiation region R in a plan view. In the present variation, recessed portion group 251b is formed in a position and in a size that include the entire phosphor portion 3 in the plan view. Therefore, the entire irradiation region R overlaps recessed portion group 251b in the plan view. Air layer 53b is provided above recessed portion group 251b.

In addition, recessed portion group 251b is formed in an annular shape about the rotation center of color conversion element 1 in the plan view. Here, each of recessed portions 25b included in recessed portion group 251b is formed in a concentric annular shape about the rotation center of color conversion element 1 in the plan view. The cross-sectional shape of each recessed portion 25b may be triangular. The cross section of each recessed portion 25b may be in any shape. Furthermore, the cross-sectional shapes of recessed portions 25b may be different from one another.

First joining portion 51b and second joining portion 52b of joining portion 5b are applied to recessed portion group 251b during manufacture. Here, at the boundary of air layer 53b, the peak portions of adjacent recesses 25b serve as walls, preventing first joining portion 51b and second joining portion 52b from entering more inward than recesses 25b. Therefore, air layer 53b can be reliably secured. Furthermore, each of first joining portion 51b and second joining portion 52b is continuously formed on recessed portions 25b. This means that the contact area between first joining portion 51b and substrate 2b and the contact area between second joining portion 52b and substrate 2b can be increased. This improves heat dissipation and adhesion, and improves the reliability of color conversion element 1B.

Variation 3

Figure 5:
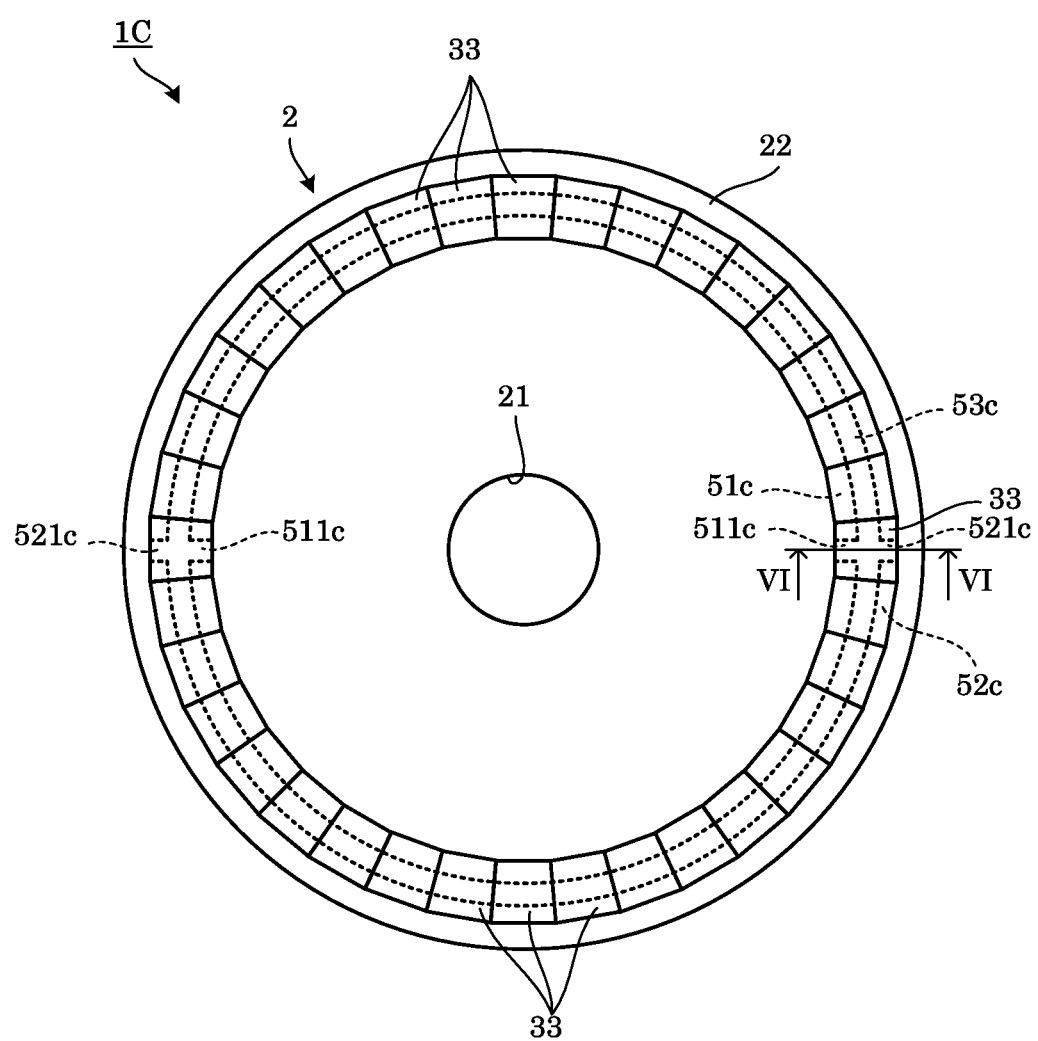
FIG. 5 is a plan view schematically illustrating the configuration of a color conversion element according to Variation 3.
Figure 6:
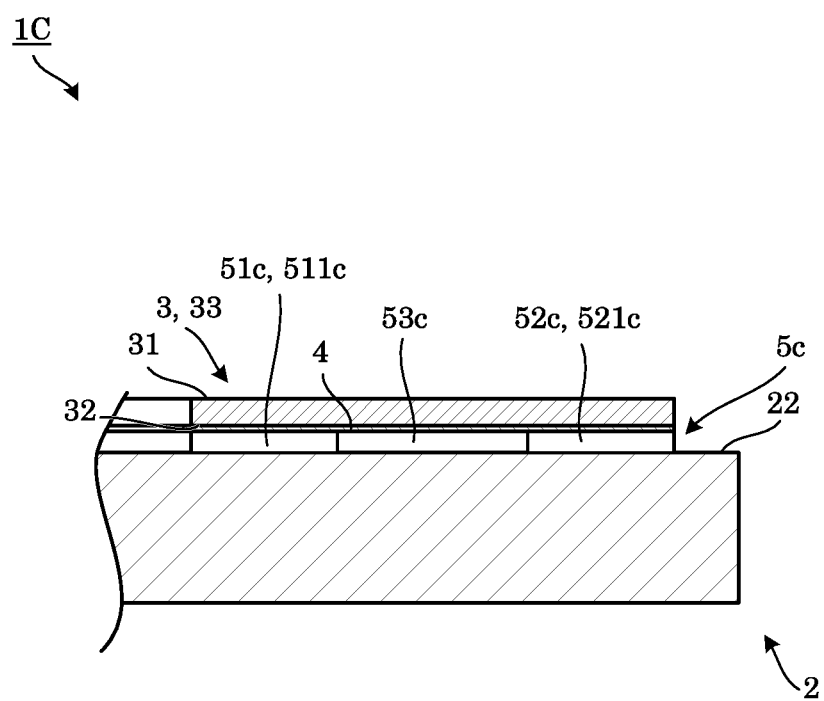
FIG. 6 is a cross-sectional view schematically illustrating the configuration of the color conversion element according to Variation 3.

Next, Variation 3 will be described. FIG. 5 is a plan view schematically illustrating the configuration of color conversion element 1C according to Variation 3, more specifically, corresponds to FIG. 1. FIG. 6 is a cross-sectional view schematically illustrating the configuration of color conversion element 1C according to Variation 3, more specifically, corresponds to FIG. 2. In the following description, the structural elements that are substantially the same as the structural elements of color conversion element 1 according to the embodiment share like reference signs. Detailed description of such structural elements will be omitted and only differences are described.

In the embodiment, an example in which air layer 53 is sealed by first joining portion 51 and second joining portion 52 of joining portion 5 has been described. Variation 3 describes an unsealed air layer 53c.

More specifically, in joining portion 5c according to Variation 3, a pair of communication holes 511c at opposite positions across the center are formed in first joining portion 51c. The pair of communication holes 511c extend along the diameter and pass through first joining portion 51c. On the other hand, in second joining portion 52c, a pair of communication holes 521c are formed at opposite positions across the center. The pair of communication holes 521c extend along the diameter and pass through second joining portion 52c. The pair of communication holes 511c in first joining portion 51c and the pair of communication holes 521c in second joining portion 52c are collinear. Air layer 53c is in commutation with the outside by communication holes 511c and 521c.

Accordingly, joining portion 5c includes communication holes 511c and 521c that communicate air layer 53c with the outside. Therefore, communication holes 511c and 521c can be used as air paths. For example, if air in air layer 53c is heated and expanded during irradiation of laser light L or during manufacture, the air is released from communication holes 511c and 521c to the outside. In other words, the shape of air layer 53c can be kept constant. Therefore, it is possible to suppress the delamination of joining portion 5c due to the shape change of air layer 53c, thereby increasing the reliability of color conversion element 1C. Note that any number of through holds may be provided at any locations.

Variation 4

Figure 7:
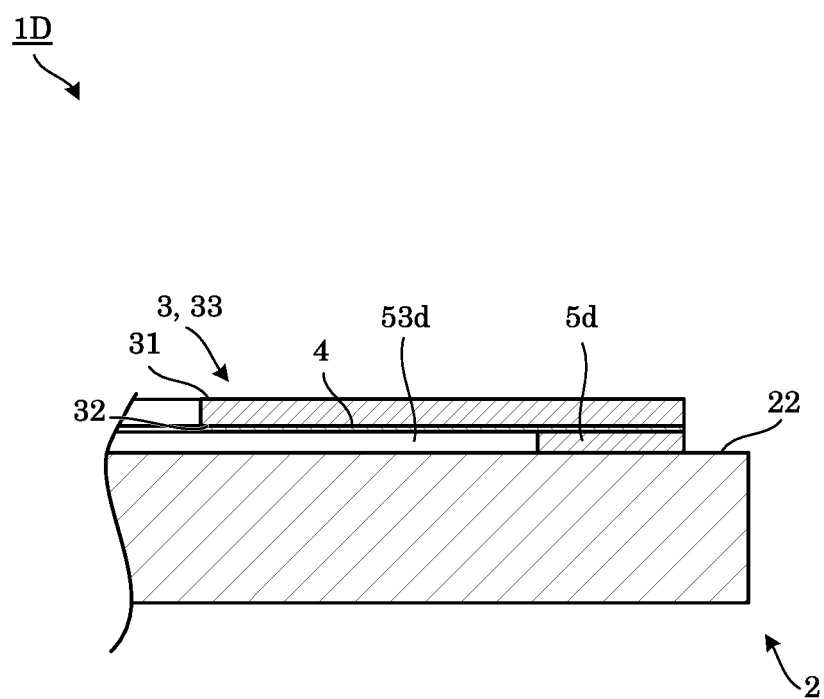
FIG. 7 is a cross-sectional view schematically illustrating the configuration of a color conversion element according to Variation 4.

Next, Variation 4 will be described. FIG. 7 is a cross-sectional view schematically illustrating the configuration of color conversion element 1D according to Variation 4, more specifically, corresponds to FIG. 2. In the following description, the structural elements that are substantially the same as the structural elements of color conversion element 1 according to the embodiment share like reference signs. Detailed description of such structural elements will be omitted and only differences are described.

In the embodiment, an example in which joining portion 5 joins substrate 2 and the outer peripheral portion of reflective layer 4, which is located in a more outward position than irradiation region R, and also joins substrate 2 and the inner peripheral portion of reflective layer 4, which is located in a more inward position than irradiation region R, has been described. Variation 4 describes when joining portion 5d joins only substrate 2 and the outer peripheral portion of reflective layer 4 located outward from irradiation region R.

More specifically, joining portion 5d is formed in an annular shape in a plan view so that the outer peripheral portion of reflective layer 4, which is located in a more outward position than irradiation region R, joins with substrate 2. Therefore, the portion that is more inward than joining portion 5d becomes air layer 53d as a whole. In this case, between substrate 2 and the inner peripheral portion of reflective layer 4, which is located in a more inward position than irradiation region R, can be considered as communication hole. In other words, an effect can be obtained that is similar to the effect obtained by providing communication holes 511c and 521c as described above.

Moreover, when color conversion element 1D is a phosphor wheel, color conversion element 1D rotates. In this case, since only the outer peripheral portion of color conversion element 1D has joining portion 5d, joining portion 5d can remain stable even if the centrifugal force caused by rotation is applied. This means that the amount of adhesive to be used can be reduced.

Variation 5

Figure 8:
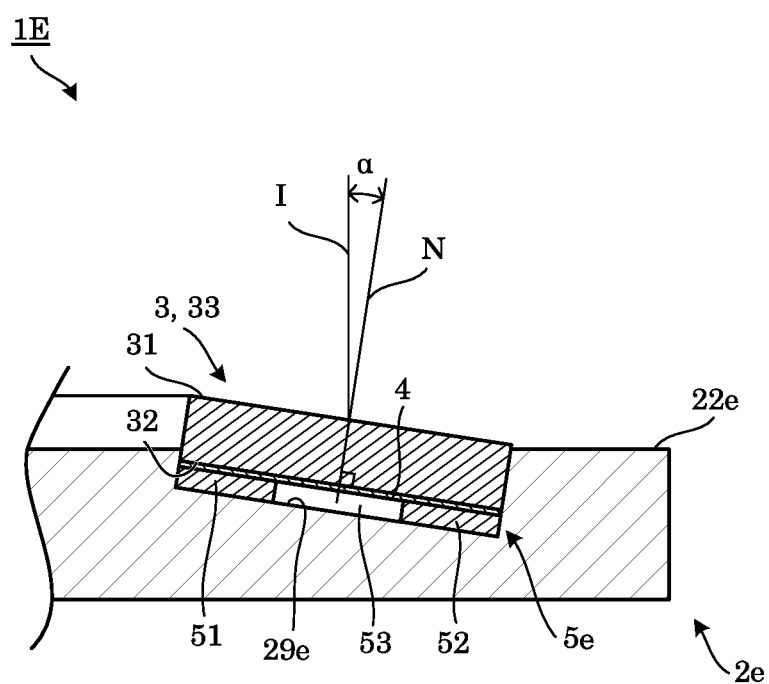
FIG. 8 is a cross-sectional view schematically illustrating the configuration of a color conversion element according to Variation 5.

Next, Variation 5 will be described. FIG. 8 is a cross-sectional view schematically illustrating the configuration of color conversion element 1E according to Variation 5, more specifically, corresponds to FIG. 2. In the following description, the structural elements that are substantially the same as the structural elements of color conversion element 1 according to the embodiment share like reference signs. Detailed description of such structural elements will be omitted and only differences are described.

In the embodiment, the example in which first principal surface 31 and second principal surface 32 of phosphor portion 3 are not tilted with respect to principal surface 22 of substrate 2 has been described. Variation 5 describes when first principal surface 31 and second principal surface 32 of phosphor portion 3 are tilted with respect to principal surface 22e of substrate 2e. Phosphor portion 3, reflective layer 4, and joining portion 5e in Variation 5 are the same as those in the embodiment, except for their orientations with respect to substrate 2e. Therefore, phosphor portion 3, reflective layer 4, and joining portion 5 are described using like reference signs.

More specifically, in principal surface 22e of substrate 2e according to Variation 5, recessed portion 29e is formed to accommodate phosphor portion 3, reflective layer 4, and joining portion 5e. Recessed portion 29e is formed in an annular shape about the rotation center in the plan view. Recessed portion 29e is recessed such that its bottom surface faces outward with respect to principal surface 22e of substrate 2e, and its inner peripheral surface and outer peripheral surface are perpendicular to its bottom surface in a cross-sectional view. Accommodating phosphor portion 3, reflective layer 4, and joining portion 5e in recessed portion 29e makes phosphor portion 3, reflective layer 4, and joining portion 5e tilt with respect to principal surface 22e of substrate 2e. More specifically, first joining portion 51 of joining portion 5e is disposed on an inner peripheral portion of the bottom surface of recessed portion 29e, and second joining portion 52 is disposed on an outer peripheral portion of the bottom surface of recessed portion 29e. Between first joining portion 51 and second joining portion 52 is air layer 53. Reflective layer 4 is disposed on first joining portion 51 and second joining portion 52. In this manner, first principal surface 31 and second principal surface 32 of phosphor portion 3 are parallel to the bottom surface of recessed portion 29e. In other words, phosphor portion 3 is embedded in recessed portion 29e to be oriented outward with respect to principal surface 22e of substrate 2e. Phosphor portion 3 partially protrudes from recessed portion 29e, while the rest is embedded in recessed portion 29e. The inner and outer sides of phosphor portion 3 are in contact with substrate 2e in recessed portion 29e. This allows heat to be transferred from the inner and outer sides of phosphor portion 3 to substrate 2e.

Phosphor portion 3 is disposed above substrate 2e and oriented such that normal direction N of second principal surface 32 of phosphor portion 3, which is a surface facing substrate 2e, is tilted with respect to incident direction I of laser light L on phosphor portion 3. Here, angle $\alpha$ between normal direction N and incident direction I is greater than or equal to critical angle $\theta c$ between air and phosphor portion 3. As a result, laser light L enters phosphor portion 3 with an incident angle that causes total internal reflection of laser light L, thus increasing the reflectance at reflective layer 4.

As described above, phosphor portion 3 is disposed above substrate 2e and oriented such that normal direction N of the principal surface (second principal surface 32) of phosphor portion 3, which is a surface facing substrate 2e, is tilted with respect to incident direction I of laser light L on phosphor portion 3.

With this, normal direction N of second principal surface 32 of phosphor portion 3 is tilted with respect to incident direction I of laser light L, making it easier to reflect all laser light L off reflective layer 4. This improves the reflectance at reflective layer 4, thereby increasing the conversion efficiency.

Moreover, angle $\alpha$ between normal direction N and incident direction I is greater than or equal to critical angle $\theta c$ between air and phosphor portion 3.

With this, laser light L enters phosphor portion 3 at the incident angle that causes total internal reflection. This reliably increases the reflectance at reflective layer 4. Therefore, conversion efficiency can be further increased.

Moreover, phosphor portion 3 is embedded in substrate 2e with a side being at least partially in contact with substrate 2e.

This allows heat to be transferred from the inner and outer sides of phosphor portion 3 to substrate 2e, thereby further increasing heat dissipation.

Note that while Variation 5 describes an example in which phosphor portion 3, reflective layer 4, and joining portion 5e are tilted with respect to principal surface 22e of substrate 2e to be oriented outward, they may be tilted to be oriented inward.

In Variation 5, an example has been described in which phosphor portion 3 is tilted with respect to principal surface 22e of substrate 2e to tilt normal direction N of second principal surface 32 of phosphor portion 3, which is a surface facing substrate 2e, with respect to incident direction I of laser light L on phosphor portion 3. However, the incident direction of laser light L may be tilted with respect to second principal surface 32 of phosphor portion 3 to tilt normal direction N with respect to incident direction I.

Note that also in Variation 5, the phosphor portion may be an integrally molded element as a whole.

Variation 6

In the embodiment, while the example in which color conversion element 1 is applied to a projection device has been described, the color conversion element may be used in a lighting device as well. In this case, the color conversion element need not be in a wheel shape, because the color conversion element does not rotate. The following is an example of a color conversion element used in a lighting device.

Figure 9:
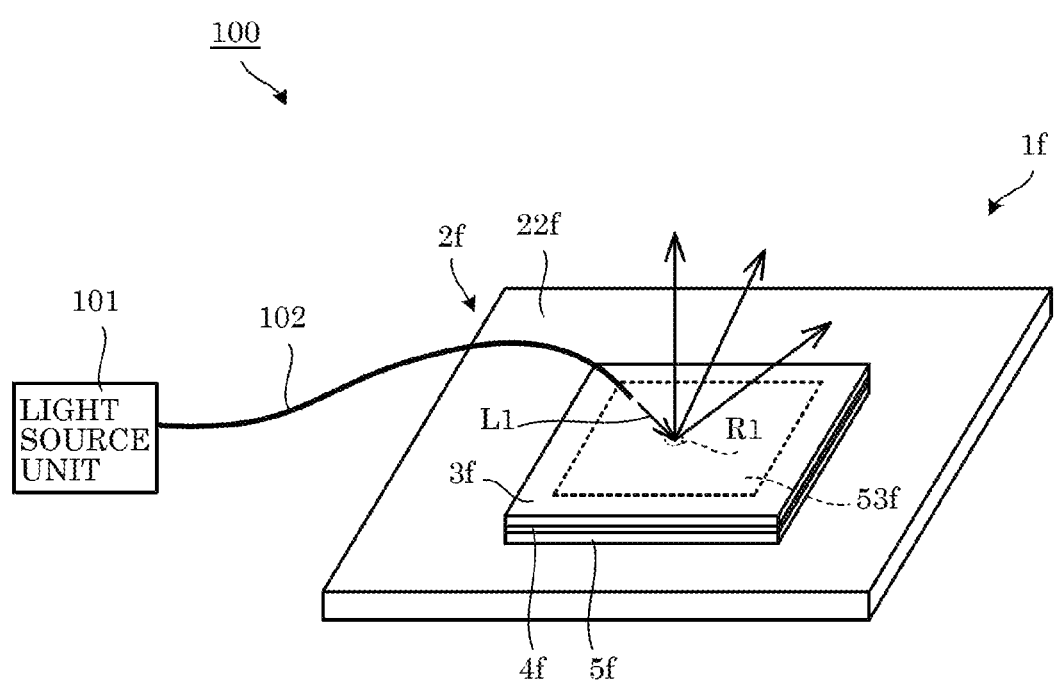
FIG. 9 is a schematic diagram of the configuration of a lighting device according to Variation 6.

FIG. 9 is a schematic diagram of the configuration of lighting device 100 according to Variation 6. As illustrated in FIG. 9, lighting device 100 includes light source unit 101, light guide component 102, and color conversion element 1F.

Light source unit 101 generates laser light L1 and supplies laser light L1 to color conversion element 1F via light guide component 102. For example, light source unit 101 is a semiconductor laser element that emits laser light L1 having a wavelength in a range of from violet to blue (430 nm to 490 nm). Light guide component 102 is a light guide component that guides laser light L1 emitted by light source unit 101 to color conversion element 1F. Light guide component 102 is, for example, an optical fiber.

Substrate 2f of color conversion element 1F is quadrilateral in a plan view. On principal surface 22f, which is one of the principal surfaces of substrate 2f, reflective layer 4f and phosphor portion 3f are stacked via joining portion 5f. Phosphor portion 3f is formed in a quadrilateral shape in the plan view, and reflective layer 4f that includes a dielectric multilayer film is disposed on the entire principal surface of phosphor portion 3. The principal surface is a surface facing substrate 2f. Joining portion 5f is formed in a frame shape that is continuous along the outer peripheral portion of phosphor portion 3f. This creates air layer 53f, which exposes reflective layer 4f, in the inward portion of joining portion 5f. Air layer 53f is located in a position where air layer 53f overlaps irradiation region R1 of laser light L1 in the plan view.

Accordingly, in lighting device 100 according to Variation 6, reflective layer 4f is exposed in a position where air layer 53f at least partially overlaps irradiation region R1 on phosphor portion 3f in the plan view. Therefore, it is possible to increase the range (90 degrees-θc) of the incident angle that causes total internal reflection, compared with when air layer 53f is not provided. Therefore, the reflectance of reflective layer 4f, which is a dielectric multilayer film, can be increased, and conversion efficiency can also be improved.

Note that the phosphor portion in the color conversion element used in the lighting device may also include a plurality of individual pieces.

Other Embodiments

The color conversion element according to one or more aspects of the present invention has been described above on the basis of the embodiment and the variations, but the present invention is not limited to the embodiment and the variations.

For example, a reflection suppression layer such as an anti-reflection (AR) coating layer may be disposed on first principal surface 31 of phosphor portion 3. First principal surface 31 is a surface from which light is emitted. This improves light extraction efficiency.

In the embodiment, an example in which phosphor portion 3 including individual pieces 33 that emit white light as a whole has been described. However, when the phosphor portion emits a plurality of colors, an area that emits the same color in phosphor portion 3 may include individual pieces of the same type. For example, a phosphor portion including three layers of red, green, and blue phosphor portions that are planarly arranged. The red phosphor portion includes a plurality of individual pieces of the same type, i.e., individual pieces including a red phosphor. The blue phosphor portion includes a plurality of individual pieces of the same type, i.e., individual pieces including a blue phosphor. The green phosphor portion includes a plurality of individual pieces of the same type, i.e., individual pieces including a green phosphor.

The scope of the present invention may also include other embodiments implemented through various changes and modifications conceived by a person of ordinary skill in the art based on the aforementioned embodiment, and embodiments obtained by combining the structural elements and functions in the aforementioned embodiment and Variations 1 to 6 in any manner within a scope not departing from the scope of the present invention.

REFERENCE MARKS IN THE DRAWINGS 1, 1A, 1B, 1C, 1D, 1E, 1F color conversion element
2, 2a, 2b, 2e, 2f substrate
3, 3f phosphor portion
4,4f reflective layer
5, 5a, 5b, 5c, 5d, 5e, 5f joining portion
21 through hole
22, 22a, 22b, 22e, 22f principal surface
25A, 25b, 29e recessed portion
32 second principal surface (principal surface)
53, 53a, 53b, 53c, 53d, 53f air layer
251b recessed portion group
511c, 521c communication hole
I incident direction
L, L1 laser light
N normal direction
R, R1 irradiation region

The invention claimed is:

1. A color conversion element, comprising:
a substrate;
a phosphor portion that is disposed above the substrate, receives laser light transmitted from an outside, and emits light in a color different from a color of the laser light;
a reflective layer that includes a dielectric multilayer film and is disposed on a principal surface of the phosphor portion, the principal surface of the phosphor portion being a surface facing the substrate; and
a joining portion that is interposed between the reflective layer and the substrate to join the reflective layer and the substrate, wherein
the joining portion includes an air layer that exposes the reflective layer and the substrate in a position where the air layer at least partially overlaps an irradiation region in a plan view, the irradiation region being a region of the phosphor portion which receives the laser light.

2. The color conversion element according to claim 1, wherein
a recessed portion is provided in a principal surface of the substrate in a position where the recessed portion at least partially overlaps the irradiation region in the plan view, and the air layer is provided above the recessed portion, the principal surface of the substrate being a surface facing the phosphor portion.

3. The color conversion element according to claim 1, wherein a recessed portion group including a plurality of recessed portions is provided on a principal surface of the substrate in a position where the recessed portion group at least partially overlaps the irradiation region in the plan view, and the air layer is provided above the recessed portion group.

4. The color conversion element according to claim 1, wherein the joining portion includes a communication hole that communicates the air layer with the outside.

5. The color conversion element according to claim 1, wherein the phosphor portion and the reflective layer each have an annular shape in the plan view, and the joining portion only joins the substrate and an outer peripheral portion of the reflective layer located in a more outward position than the irradiation region.

6. The color conversion element according to claim 1, wherein the phosphor portion is disposed above the substrate with a normal direction of the principal surface of the phosphor portion being tilted with respect to an incident direction of the laser light on the phosphor portion.

7. The color conversion element according to claim 1, wherein the phosphor portion includes a plurality of individual pieces having a sheet shape and being planarly arranged, the plurality of individual pieces including at least one type of phosphor.

8. The color conversion element according to claim 1, wherein the phosphor portion is embedded in the substrate, with a side of the phosphor portion being at least partially in contact with the substrate.

* * * * *